(12) United States Patent
Kim et al.

(10) Patent No.: US 11,030,967 B2
(45) Date of Patent: Jun. 8, 2021

(54) DISPLAY DEVICE AND METHOD OF DRIVING THE SAME

(71) Applicant: Samsung Display Co., Ltd., Yongin-Si (KR)

(72) Inventors: Kyunho Kim, Hwaseong-si (KR);
Bonggyun Kang, Suwon-si (KR);
Sungjin Kim, Gwangju (KR);
Neung-Beom Lee, Hwaseong-si (KR);
Jun Pyo Lee, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 95 days.

(21) Appl. No.: 16/401,600

(22) Filed: May 2, 2019

(65) Prior Publication Data

US 2020/0035173 A1    Jan. 30, 2020

(30) Foreign Application Priority Data

Jul. 25, 2018    (KR) .................. 10-2018-0086705

(51) Int. Cl.
*G09G 3/36*    (2006.01)
*G06T 7/00*    (2017.01)

(52) U.S. Cl.
CPC ......... *G09G 3/3607* (2013.01); *G06T 7/0002* (2013.01); *G09G 3/3614* (2013.01); *G09G 3/3688* (2013.01); *G06T 2207/30168* (2013.01); *G09G 2320/0209* (2013.01); *G09G 2320/0673* (2013.01)

(58) Field of Classification Search
CPC ... G09G 2320/0247; G09G 2320/0673; G09G 3/2007; G09G 3/3258; G09G 2320/043; G09G 2310/0289; G09G 2320/0209; G09G 2320/0233; G09G 2320/0626; G09G 2330/021; G09G 2320/0204; G09G 2320/0252
USPC .......................................... 345/609, 87–102
See application file for complete search history.

(56) References Cited

U.S. PATENT DOCUMENTS 9,191,657 B2 * 11/2015 Kim ..................... H04N 13/337
9,754,545 B2 * 9/2017 Han ..................... G09G 3/3648
2010/0207963 A1 * 8/2010 Lee ..................... G09G 3/3688
345/690

(Continued)

FOREIGN PATENT DOCUMENTS

KR    100336039 B1    5/2002
KR    101365066 B1    2/2014

(Continued)

*Primary Examiner* — Duc Q Dinh
(74) *Attorney, Agent, or Firm* — Cantor Colburn LLP (57) ABSTRACT

A display device includes an image analyzing part which determines whether current frame image data includes a crosstalk pattern, and a gamma voltage generator which generates current frame gamma data by applying the asymmetric gamma when the current frame image data do not include the crosstalk pattern, and generates the current frame gamma data by applying a symmetric gamma when the current frame image data includes the crosstalk pattern. The positive polarity and negative polarity data voltages of the asymmetric gamma are asymmetric with each other for each of the grayscales, and the positive polarity and negative polarity data voltages of the symmetric gamma are symmetric with each other for each of the grayscales.

17 Claims, 7 Drawing Sheets

(56) References Cited

U.S. PATENT DOCUMENTS

2017/0148369 A1*  5/2017  Park ................... G09G 3/2007
2020/0005725 A1*  1/2020  Gao .................... G02F 1/13306

FOREIGN PATENT DOCUMENTS

KR    1020150070635 A    6/2015
KR       101604491 B1    3/2016

* cited by examiner

DISPLAY DEVICE AND METHOD OF DRIVING THE SAME

This application claims priority to Korean Patent Application No. 10-2018-0086705 filed on Jul. 25, 2018, and all the benefits accruing therefrom under 35 U.S.C. § 119, the content of which in its entirety is herein incorporated by reference.

BACKGROUND

1. Field

Exemplary embodiments of the invention relate to a display device and a method of driving the display device. More particularly, exemplary embodiments of the invention relate to a display device with improved display quality and a method of driving the display device.

2. Description of the Related Art

In general, a liquid crystal display ("LCD") includes a liquid crystal layer disposed between a display substrate and an opposite substrate.

The liquid crystal display device typically includes a plurality of pixels. Each pixel may include a switching element connected to a data line and a gate line, a liquid crystal capacitor connected to the switching element, and a storage capacitor connected to the liquid crystal capacitor.

The liquid crystal display may display an image using a positive polarity data voltage and a negative polarity data voltage with a common voltage applied to the storage capacitor as a reference voltage.

SUMMARY

Exemplary embodiments of the invention provide a display device with improved display quality.

Exemplary embodiments of the invention provide a method of driving the display device.

According to an exemplary embodiment of the invention, a display device includes a display panel comprising a data line and sub-pixels of different colors, where the sub-pixels of different colors connected to a same data line, a data driver which outputs a positive polarity data voltage and a negative polarity data voltage with respect to a reference voltage to the data line, an image analyzing part which determines whether current frame image data includes a crosstalk pattern, and a gamma voltage generator which generates current frame gamma data by applying the asymmetric gamma when the current frame image data do not include the crosstalk pattern, and generates the current frame gamma data by applying a symmetric gamma when the current frame image data includes the crosstalk pattern, where the positive polarity and negative polarity data voltages of the asymmetric gamma are asymmetric with each other for each of the grayscales, and the positive polarity and negative polarity data voltages of the symmetric gamma are symmetric with each other for each of the grayscales.

In an exemplary embodiment, the gamma voltage generator may include a symmetric gamma generator which generates the current gamma data for each of the grayscales by applying the symmetric gamma and an asymmetric gamma generator which generates the current gamma data for each of the grayscales by applying the asymmetric gamma.

In an exemplary embodiment, the display device may further include an interpolation gamma generator which generates the current frame gamma data for each of the grayscales by applying an interpolation gamma having a value between the symmetric gamma and the asymmetric gamma.

In an exemplary embodiment, the interpolation gamma generator may generate the current frame gamma data by applying the interpolation gamma during set frame periods when the current frame image data include the crosstalk pattern and previous frame image data are normal image data.

In an exemplary embodiment, the interpolation gamma generator may generate the current frame gamma data by applying the interpolation gamma during set frame periods when the current frame image data do not include the crosstalk pattern and previous frame image data include the crosstalk pattern.

In an exemplary embodiment, the interpolation gamma generator may comprise a plurality of interpolation gammas which change gradually.

In an exemplary embodiment, the gamma generator may include a look-up table or calculation circuit.

In an exemplary embodiment, a grayscale area may include a low grayscale area including a grayscale lower than a reference low grayscale, a high grayscale area including a grayscale higher than a reference high grayscale, and an intermediate grayscale area including an intermediate grayscale between the reference low grayscale and the reference high grayscale, and the positive polarity and negative polarity data voltages of the symmetric gamma may be symmetric with each other for each of the grayscales in the low grayscale area, the middle grayscale area and the high grayscale area.

In an exemplary embodiment, the positive polarity and negative polarity data voltages of the asymmetric gamma may be symmetric with each other for each of the grayscales in the low grayscale area and the high grayscale area, and the positive polarity and negative polarity data voltages of the asymmetric gamma may be asymmetric with each other for each of the grayscales in the middle grayscale area.

In an exemplary embodiment, the crosstalk pattern may include a background image of a low grayscale and a box image comprising a middle grayscale of a mono color and located in a center of the background image.

According to an exemplary embodiment of the invention, a method of driving a display device which includes a data line and sub-pixels of different colors, where the sub-pixels are connected to a same data line. In such an embodiment, the method includes determining whether current frame image data includes a crosstalk pattern, and generating current frame gamma data based on a result of the determining whether the current frame image data includes the crosstalk pattern, where the generating the current frame gamma data includes generating current frame gamma data by applying an asymmetric gamma when the current frame image data do not include the crosstalk pattern, and generating the current frame gamma data by applying a symmetric gamma when the current frame image data includes the crosstalk pattern.

In an exemplary embodiment, the generating the current frame gamma data may further include generating the current frame gamma data for each of the grayscales by applying an interpolation gamma having a value between the symmetric gamma and the asymmetric gamma.

In an exemplary embodiment, the generating the current frame gamma data may further include generating the current frame gamma data by applying the interpolation gamma during set frame periods when the current frame image data include the crosstalk pattern and previous frame image data do not include the crosstalk pattern.

In an exemplary embodiment, the generating the current frame gamma data may further include generating the current frame gamma data by applying the interpolation gamma during set frame periods when the current frame image data do not include the crosstalk pattern and previous frame image data include the crosstalk pattern.

In an exemplary embodiment, the generating the current frame gamma data may further include using a look-up table or a calculation circuit.

In an exemplary embodiment, a grayscale area may include a low grayscale area including a grayscale lower than a reference low grayscale, a high grayscale area including a grayscale higher than a reference high grayscale, and an intermediate grayscale area including an intermediate grayscale between the reference grayscale and the reference high grayscale, and the positive polarity and negative polarity data voltages of the symmetric gamma may be symmetric with each other for each of the grayscales in the low grayscale area, the middle grayscale area and the high grayscale area.

In an exemplary embodiment, the positive polarity and negative polarity data voltages of the asymmetric gamma may be symmetric with each other for each of the grayscales in the low grayscale area and the high grayscale area, and the positive polarity and negative polarity data voltages of the asymmetric gamma may be asymmetric with each other for each of the grayscales in the middle grayscale area.

According to exemplary embodiments of the invention, the display device may display an image with improved display quality by applying the symmetric gamma for the image data including a crosstalk pattern, in which the crosstalk may be observed, and applying the asymmetric gamma for the normal image data without the crosstalk pattern.

BRIEF DESCRIPTION OF THE DRAWINGS

The above and other features of the invention will become more apparent by describing in detailed exemplary embodiments thereof with reference to the accompanying drawings, in which.

DETAILED DESCRIPTION

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "connected to" another element, it can be directly connected to the other element or intervening elements may be present therebetween. In contrast, when an element is referred to as being "directly connected to" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. "At least one of A and B" means "A or B." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, the invention will be explained in detail with reference to the accompanying drawings.

Figure 1:
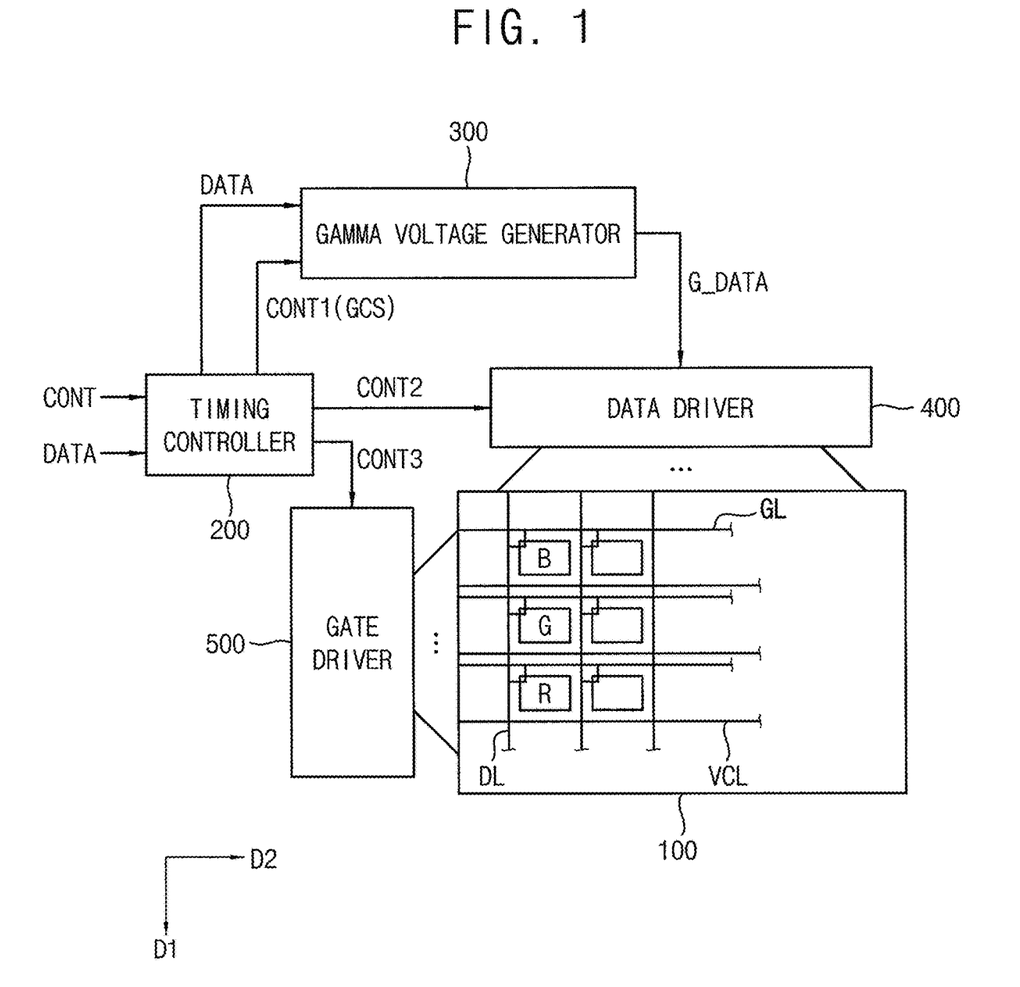
FIG. 1 is a block diagram illustrating a display device according to an exemplary embodiment.

FIG. 1 is a block diagram illustrating a display device according to an exemplary embodiment.

Referring to FIG. 1, an exemplary embodiment of the display device may include a display panel 100, a timing controller 200, a gamma voltage generator 300, a data driver 400 and a gate driver 500.

The display panel 100 may include a plurality of data lines DL, a plurality of gate lines GL, a plurality of common voltage lines VCL and plurality of pixel parts. The data lines DL extend in a first direction D1 and are arranged in a second direction D2 crossing the first direction D1. The gate lines GL extend in the second direction D2 and are arranged in the first direction D1. The common voltage lines VCL extend in the second direction D2 and are arranged in the first direction D1.

The pixel parts are arranged in a matrix form including a plurality of pixel rows and a plurality of pixel columns. Each of the pixel parts may include a plurality of sub pixels. In one exemplary embodiment, for example, the pixel part PU may include a red sub pixel R, a green sub pixel G and a blue sub pixel B.

Each sub pixel includes a switching transistor connected to a data line and a gate line, a liquid crystal capacitor connected to the switching transistor and a storage capacitor connected to the liquid crystal capacitor. The common voltage line VCL transfers a common voltage Vcom to a common electrode of the storage capacitor.

Each of the red sub pixel R, the green sub pixel G and the blue sub pixel B of a pixel has a short side corresponding to the first direction D1 and a long side corresponding to the second direction D2 and are connected to a same data line as each other.

The timing controller 200 is configured to generally control operations of the display device. The timing controller 200 is configured to receive image data DATA and a control signal CONT from an external device.

The timing controller 200 may be configured to correct the image data DATA using a correction algorithm. The timing controller 200 may be configured to transfer the image data DATA to the gamma voltage generator 300.

The timing controller 200 is configured to generate a plurality of control signals for driving the display panel 100 based on the control signal CONT. The plurality of control signals may include a first control signal CONT1 for driving the gamma voltage generator 300, a second control signal CONT2 for driving the data driver 400 and a third control signal CONT3 for driving the gate driver 500.

According to an exemplary embodiment, the first control signal CONT1 may include a gamma control signal GCS for driving the gamma voltage generator 300 according to whether current frame image data include a crosstalk pattern.

The gamma voltage generator 300 is configured to generate and output gamma data G_DATA corresponding to the current frame image data DATA, e.g., symmetric gamma data and asymmetric gamma data, based on the gamma control signal GCS.

According to the exemplary embodiment, when the current frame image data include the crosstalk pattern, the gamma voltage generator 300 generates the current frame image data as a symmetric structure of positive polarity and negative polarity gamma data based on a reference voltage that is a common voltage. In such an embodiment, when the current frame image data does not include the crosstalk pattern, that is, the current frame image data are normal image data, the gamma voltage generator 300 generates the current frame image data as the asymmetric structure of positive polarity and negative polarity gamma data based on the common voltage.

The data driver 400 is configured to convert the gamma data G_DATA supplied from the gamma voltage generator 300 into a data voltage and outputs the data voltage to the data line DL.

The gate driver 500 is configured to generate a plurality of gate signals and sequentially output the gate lines GL of the display panel 100. The gate driver 500 may include a shift register including a plurality of transistors directly integrated in a display panel.

Figure 2:
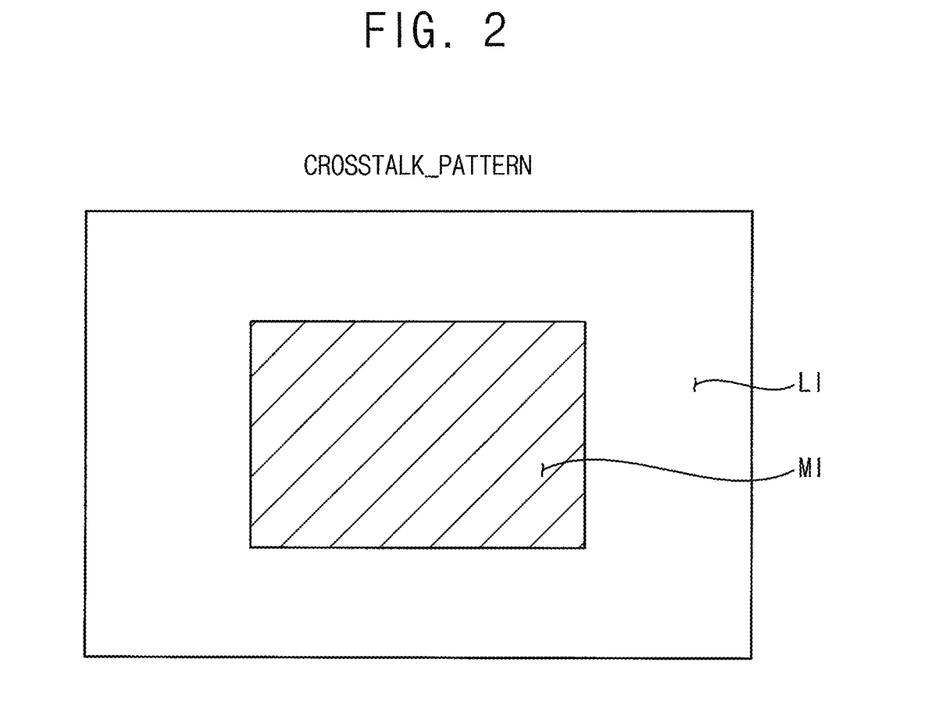
FIG. 2 is a conceptual diagram illustrating a crosstalk pattern according to an exemplary embodiment.
Figure 3:
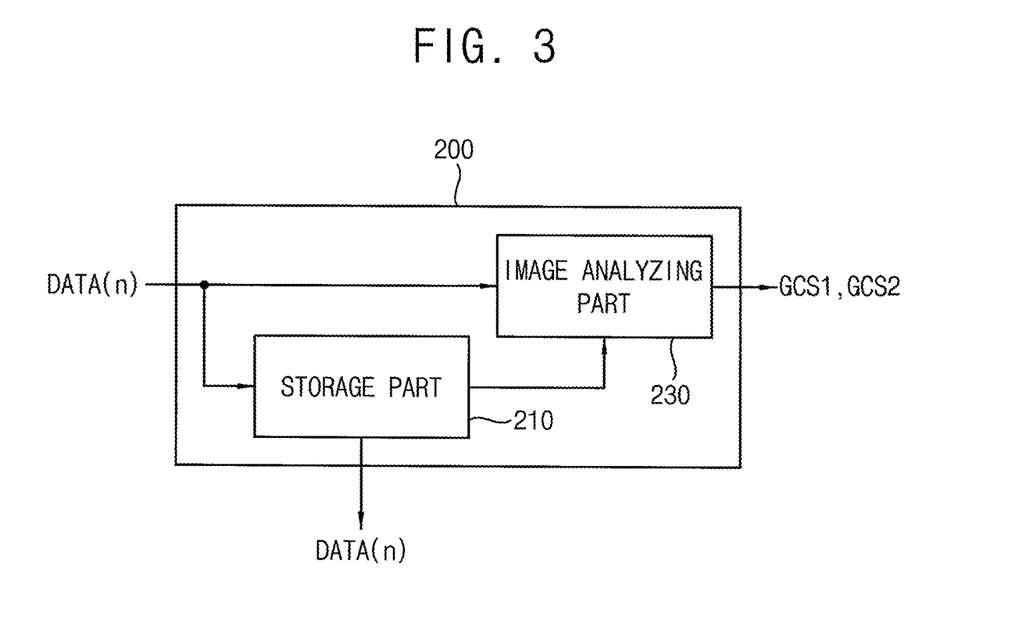
FIG. 3 is a block diagram illustrating a timing controller according to an exemplary embodiment.

FIG. 2 is a conceptual diagram illustrating a crosstalk pattern according to an exemplary embodiment. FIG. 3 is a block diagram illustrating a timing controller according to an exemplary embodiment.

Referring to FIGS. 1, 2 and 3, the timing controller 200 may include a storage part 210 and an image analyzing part 230.

The storage part 210 is configured to store frame image data. The storage part 210 may be a frame memory for a dynamic capacitance compensation ("DCC") to improve a response time of the liquid crystal.

The image analyzing part 230 is configured to analyzes current frame image data DATA(n) which are currently received.

In one exemplary embodiment, for example, the image analyzing part 230 is configured to determines whether the current frame image data DATA(n) include a crosstalk pattern (CROSSTALK_PATTERN) or are normal image data that do not include the crosstalk pattern (CROSSTALK_PATTERN).

Referring to FIG. 2, the crosstalk pattern CROSSTALK_PATTERN includes a background image L1 and a box image M1 located in a center of the background image L1.

The background image L1 includes red, green and blue data having a low grayscale and the box image M1 includes one color data of the red, green and blue having a middle grayscale and other two color data having zero (0)-grayscale.

In one exemplary embodiment, for example, where an entire grayscale range is from 0-grayscale to 255-grayscale, the background image L1 includes the red, green and blue data having 32-grayscale to 64-grayscale. In such an embodiment, the box image M1 includes one color data of the red, green and blue data having 65-grayscale to 150-grayscale and other two color data having 0-grayscale. In such an embodiment, when the box image M1 includes the green data having 65-grayscale to 150-grayscale and the red and blue data having 0-grayscale, a horizontal crosstalk may be observed the greatest.

In an exemplary embodiment, the image analyzing part 230 is configured to generate a first gamma control signal GCS1 when the current frame image data DATA(n) are crosstalk image data including a crosstalk pattern. In such an embodiment, the image analyzing part 230 generates a second gamma control signal GCS2 when the current frame image data DATA(n) are normal image data that do not include a crosstalk pattern.

The image analyzing part 230 is configured to provide the first and second gamma control signals GCS1 and GCS2 to the gamma voltage generator 300 based on the analysis of the current frame image data DATA(n).

Figure 4:
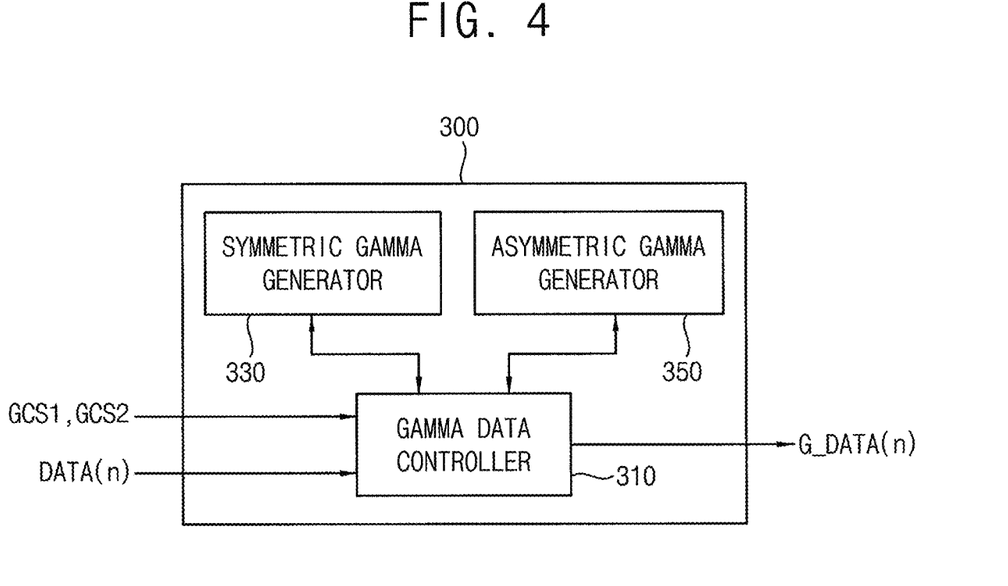
FIG. 4 is a block diagram illustrating a gamma data generator according to an exemplary embodiment.
Figure 5:
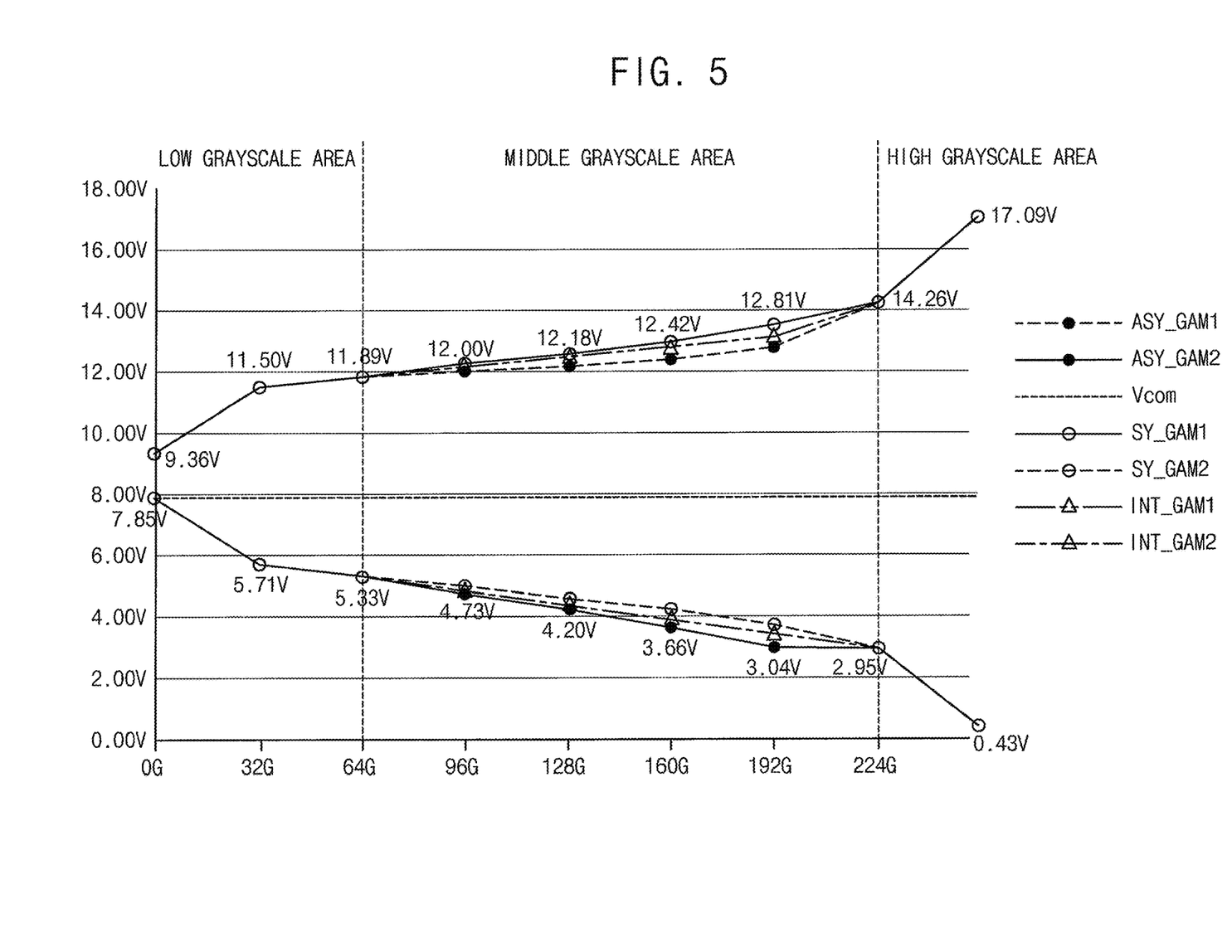
FIG. 5 is a graph diagram illustrating a symmetric gamma and an asymmetric gamma according to an exemplary embodiment.

FIG. 4 is a block diagram illustrating a gamma data generator according to an exemplary embodiment. FIG. 5 is a graph diagram illustrating a symmetric gamma and an asymmetric gamma according to an exemplary embodiment.

Referring to FIGS. 1, 3 and 4, the gamma voltage generator 300 may include a gamma data controller 310, a symmetric gamma generator 330 and an asymmetric gamma generator 350.

In an exemplary embodiment, the gamma data controller 310 is configured to generate current frame gamma data G_DATA(n) using the symmetric gamma generator 330 or the asymmetric gamma generator 350 based on the gamma control signals GCS1 and GCS2, and to output the generated current frame gamma data G_DATA(n).

The symmetric gamma generator 330 is configured to generate positive polarity gamma data and negative polarity gamma data for each of the grayscales based on positive polarity and negative polarity symmetric gammas, which are symmetric with respect to a reference voltage, e.g., the common voltage Vcom. The symmetric gamma generator 330 may include a look-up table and a calculation circuit.

Referring to FIG. 5, according to an exemplary embodiment, an entire grayscale area may be divided into a low grayscale area, a middle grayscale area, and a high grayscale area based on a reference low grayscale and a reference high grayscale.

In one exemplary embodiment, for example, the entire grayscale area (0-grayscale to 255-grayscale) includes a low grayscale area that includes a grayscale lower than the reference low grayscale (64-grayscale), a high grayscale area that includes a higher grayscale than the reference high grayscale (224-grayscale) and a middle grayscale area including a middle grayscale between the reference low grayscale and the reference high grayscale.

In an exemplary embodiment, the symmetric gamma includes a positive polarity symmetric gamma SY_GAM1 having a positive polarity data voltage with respect to the common voltage Vcom for each of the grayscales, and a negative polarity symmetric gamma SY_GAM2 having a negative polarity data voltage with respect to the common voltage Vcom for each of the grayscales.

In the symmetric gamma, the negative polarity data voltage and the positive polarity data voltage for each of grayscales are symmetric with respect to the common voltage in all the low grayscale area, the middle grayscale area and the high grayscale area. The symmetric gamma may reduce the common voltage ripple and improve the horizontal crosstalk.

In an exemplary embodiment, the asymmetric gamma generator 350 is configured to generate positive polarity gamma data and negative polarity gamma data for each of the grayscales based on the positive and negative asymmetric gammas, which are asymmetric with respect to the reference voltage. The asymmetric gamma generator 350 may include a lookup table and a calculation circuit.

Referring to FIG. 5, in an exemplary embodiment, the asymmetric gamma includes a positive polarity asymmetric gamma ASY_GAM1 having a positive polarity data voltage for each of the grayscales and a negative polarity asymmetric gamma ASY_GAM2 having a negative polarity data voltage for each of the grayscales with respect to the common voltage Vcom.

In the asymmetric gamma, the negative polarity and positive polarity data voltages for each of the grayscales are symmetrical with respect to the common voltage in the low grayscale area and the high grayscale area, and the negative polarity and positive polarity data voltages for each of the grayscales are asymmetric with respect to the common voltage in the middle grayscale area. In general, an optimum common voltage for reducing flicker is different by each of the grayscales. The asymmetric gamma may improve the afterimage by reducing flicker in each of the grayscales.

As the described above, according to an exemplary embodiment, the afterimage may be removed by applying asymmetric gamma in the middle grayscale area, and the horizontal crosstalk may be reduced by applying the symmetric gamma in the low grayscale area and the high grayscale area.

The gamma data controller 310 receives the first gamma control signal GCS1 when the current frame image data DATA(n) includes a crosstalk pattern. The gamma data controller 310 generates the current frame gamma data G_DATA(n) using the symmetric gamma generator 330 and outputs the current frame image data DATA(n).

The box image representing a mono color having the middle grayscale in the center of the crosstalk pattern may produce a distorted kickback waveform in the asymmetric gamma area and produce an asymmetrical distorted common voltage ripple. As the common voltage line for transmitting the common voltage extends in the horizontal direction of the display panel, the common voltage ripple formed at the center of the display panel is spread in the horizontal direction so that the horizontal crosstalk may be observed.

According to an exemplary embodiment, when the current frame image data includes the crosstalk pattern, the current frame image data is converted based on the current frame gamma data by the symmetric gamma generator 330. Thus, the common voltage ripple may be reduced in the box image of the middle grayscale displayed at the center, and the horizontal crosstalk may be reduced.

In such an embodiment, the gamma data controller 310 receives the second gamma control signal GCS2 when the image data DATA(n) of the current frame is the normal image data that do not include the crosstalk pattern. The gamma data controller 310 generates the current frame gamma data G_DATA(n) using the asymmetric gamma generator 350 and outputs the current frame image data DATA(n). Therefore, the afterimage may be reduced by applying asymmetric gamma in the middle grayscale area, thereby reducing the flicker, and the horizontal crosstalk may be reduced by applying the symmetric gamma in the low grayscale area and the high grayscale area.

Figure 6:
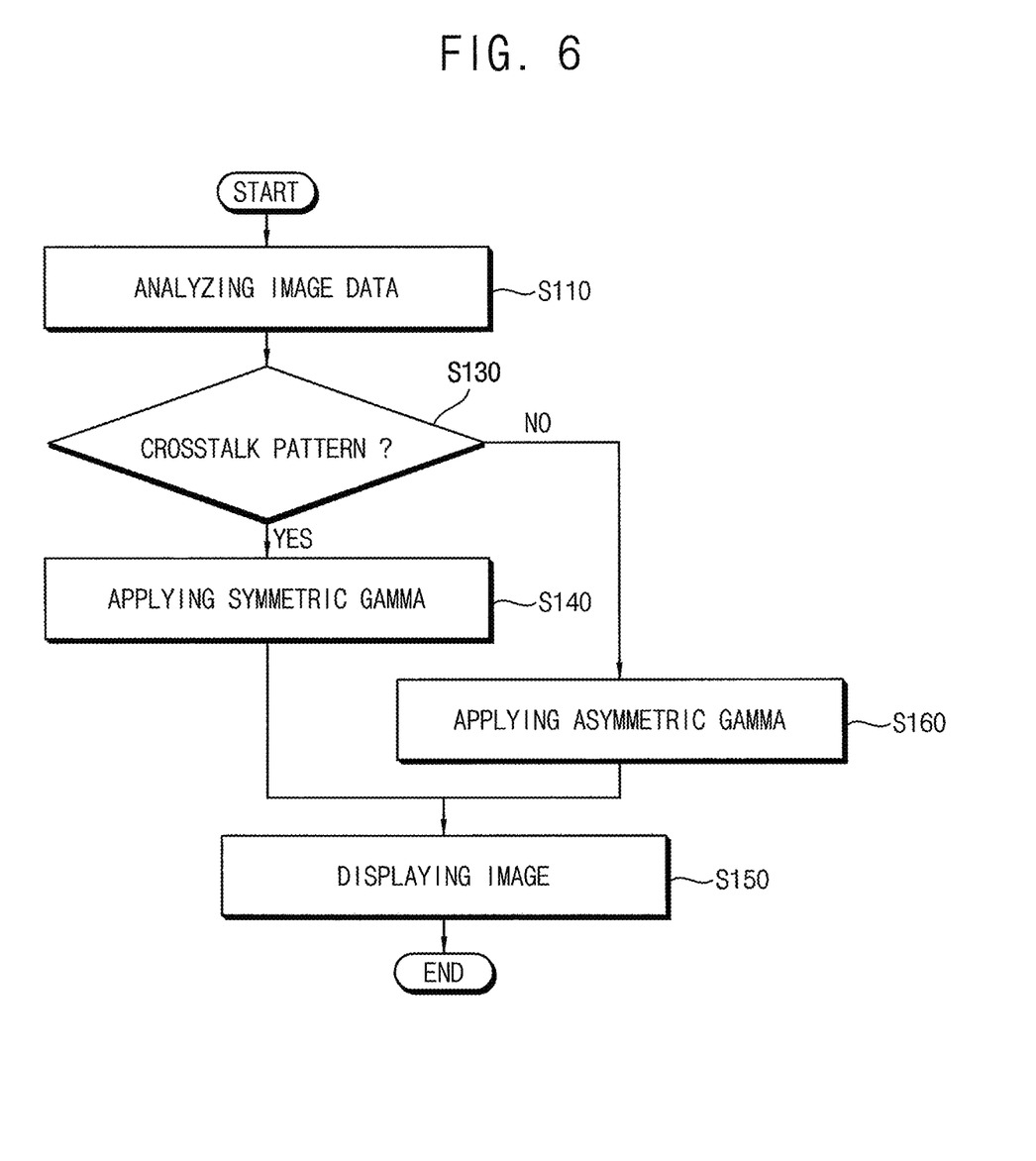
FIG. 6 is a flowchart illustrating a method of driving a display device according to an exemplary embodiment.

FIG. 6 is a flowchart illustrating a method of driving a display device according to an exemplary embodiment.

Referring to FIGS. 1, 3, 4 and 6, the image analyzing part 230 analyzes the current frame image data DATA(n) received for a current frame (S110).

When the current frame image data DATA(n) include the crosstalk image data, the image analyzing part 230 outputs the first gamma control signal GCS1 to the gamma voltage generator 300 (S130).

The gamma data controller 310 generates the current frame gamma data DATA(n) as the current frame gamma data G_DATA(n) by using the symmetric gamma generator 330 based on the first gamma control signal GCS1, and outputs the current frame gamma data G_DATA(n) (S140).

The data driver 400 generates the data voltage by converting the current frame gamma data G_DATA(n). In one exemplary embodiment, for example, the data driver 400 may convert the current frame gamma data G_DATA(n) in a digital form to the data voltage in an analog form. The data driver 400 outputs the data voltage to the data line DL. The gate driver 500 sequentially outputs the gate signal to the gate line in synchronization with the driving of the data driver 400. Thus, a crosstalk pattern image corresponding to the current frame gamma data G_DATA(n) may be displayed (S150).

Therefore, by applying symmetric gamma to a box image of a middle grayscale displayed in a mono color at the center of the crosstalk pattern, the common voltage ripple may be reduced. The horizontal crosstalk caused by the common voltage ripple may be improved when the crosstalk pattern is displayed.

In such an embodiment, when the current frame image data DATA(n) are normal image data that do not include a crosstalk pattern, the second gamma control signal GCS2 is outputted to the gamma voltage generator 300.

The gamma data controller 310 generates the current frame gamma data DATA(n) as the current frame gamma data G_DATA(n) by using the asymmetric gamma generator 350 based on the second gamma control signal GCS2, and outputs the current frame gamma data G_DATA(n) (S160).

The data driver 400 generates the data voltage by converting the current frame gamma data G_DATA(n). The data driver 400 outputs the data voltage to the data line DL. The gate driver 500 sequentially outputs the gate signal to the gate line in synchronization with the driving of the data driver 400. Thus, a normal image corresponding to the current frame gamma data G_DATA(n) may be displayed (S150).

Therefore, the normal image may be improved by applying the asymmetric gamma in the middle grayscale area, and the horizontal crosstalk may be reduced by applying the symmetric gamma in the low grayscale area and the high grayscale area.

Figure 7:
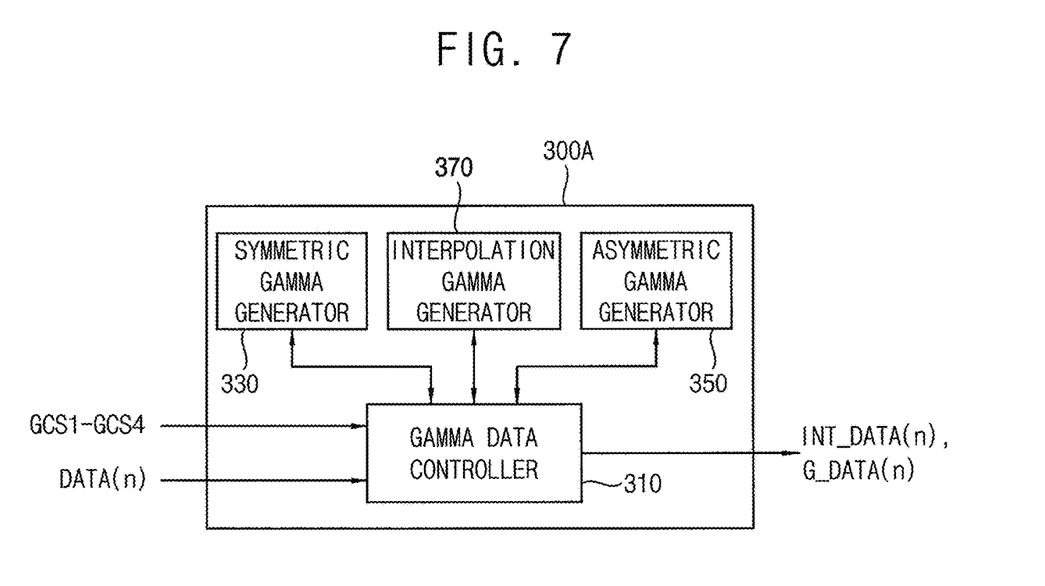
FIG. 7 is a block diagram illustrating a gamma data generator according to an alternative exemplary embodiment.

FIG. 7 is a block diagram illustrating a gamma data generator according to an alternative exemplary embodiment.

Referring to FIGS. 1, 3 and 7, an exemplary embodiment of the gamma voltage generator 300A may include a gamma data controller 310, a symmetric gamma generator 330, an asymmetric gamma generator 350 and an interpolation gamma generator 370.

The gamma data controller 310 is configured to generate current frame gamma data G_DATA(n) using the symmetric gamma generator 330, the asymmetric gamma generator 350 and the interpolation gamma generator 370 based on gamma control signals GCS1 to GCS4 received from the image analyzing part 230, and output the generated current frame gamma data G_DATA(n).

The symmetric gamma generator 330 is configured to generate positive polarity gamma data and negative polarity gamma data for each of the grayscales based on positive polarity and negative polarity symmetric gammas SY_GAM1 and SY_GAM2 as shown in FIG. 5 which are symmetric with respect to a reference voltage, e.g., the common voltage Vcom. The symmetric gamma generator 330 may include a look-up table and a calculation circuit.

The asymmetric gamma generator 350 is configured to generate positive polarity gamma data and negative polarity gamma data for each of the grayscales based on the positive and negative asymmetric gammas ASY_GAM1 and ASY_GAM2 which are asymmetric with respect to the reference voltage as shown in FIG. 5. The asymmetric gamma generator 350 may include a lookup table and a calculation circuit.

The interpolation gamma generator 370 is configured to generate positive polarity gamma data and negative polarity gamma data for each of the grayscales based on the positive and negative interpolation gamma INT_GAM1 and INT_GAM2 which are asymmetric with respect to the reference voltage as shown in FIG. 5. The interpolation gamma generator 370 may include a lookup table and a calculation circuit.

Referring back to FIG. 5, the positive polarity interpolation gamma INT_GAM1 corresponds a value between the positive polarity symmetric gamma SY_GAM1 and the positive polarity asymmetric gamma ASY_GAM1. The negative polarity interpolation gamma INT_GAM2 corresponds a value between the negative polarity symmetric gamma SY_GAM2 and the negative polarity asymmetric gamma ASY_GAM2.

In an exemplary embodiment, the interpolation gamma may include a plurality of positive polarity interpolation gammas that progressively change between the positive polarity symmetric gamma (SY_GAM1) and the positive polarity asymmetric gamma (ASY_GAM1) and a plurality of negative polarity interpolation gammas that progressively change between the negative polarity symmetric gamma SY_GAM2 and the negative polarity asymmetric gamma ASY_GAM2.

The image analyzing part 230 is configured to provide the gamma data controller 310 with a first gamma control signal GCS1, when the current frame image data DATA(n) are crosstalk image data including a crosstalk pattern and are changed from the previous frame image data of the normal image data.

The gamma data controller 310 uses the interpolation gamma generator 370 to generate interpolation frame gamma data INT_DATA(n) for the current frame image data DATA(n) during set frame periods (e.g., during a predetermined number of frames) based on the first gamma control signal GCS1, and the gamma data controller 310 generates and outputs the interpolation frame gamma data INT_DATA(n). Then, when the set frame periods end, the gamma data controller 310 uses the symmetric gamma generator 330 to generate current frame gamma data G_DATA(n) for the current frame image data DATA(n) and outputs the current frame gamma data G_DATA(n).

Based on a result of analyzing the image data of the image analyzing part 230, when it is determined that the current frame image data DATA(n) includes the crosstalk patterns and are to the same as previous frame image data, the image analyzing part 230 provides the gamma data controller 310 to the second gamma control signal GCS2.

The gamma data controller 310 uses the symmetric gamma generator 330 to generate the current frame gamma data G_DATA(n) for the current frame image data DATA(n) based on the second gamma control signal GCS2.

Based on a result of the image data analysis by the image analyzing part 230, when it is determined that the current frame image data DATA(n) are the normal image data without the crosstalk pattern and are changed from the previous frame image data including the crosstalk pattern, the image analyzing part 230 provides the gamma data controller 310 with the third gamma control signal GCS3.

The gamma data controller 310 uses the interpolation gamma generator 370 to generate interpolation frame gamma data INT_DATA(n) for the current frame image data DATA(n) during set frame periods based on the third gamma control signal GCS3 and the outputs interpolation frame gamma data INT_DATA(n). Then, when the set frame periods end, the gamma data controller 310 uses the asymmetric gamma generator 350 to generate current frame gamma data G_DATA(n) for the current frame image data DATA(n) and outputs the current frame gamma data G_DATA(n).

Based on a result of analyzing the image data of the image analyzing part 230, when it is determined that the current frame image data DATA(n) are the normal image data without the crosstalk pattern and are the same as the previous frame image data, the image analyzing part 230 provides the gamma data controller 310 to the forth gamma control signal GCS4.

The gamma data controller 310 uses the asymmetric gamma generator 350 to generate the current frame gamma data G_DATA(n) for the current frame image data DATA(n) based on the fourth gamma control signal GCS4.

Accordingly, when the crosstalk pattern image changes to the normal image or the normal image changes to the crosstalk pattern image, the interpolation image to which at least one of the interpolation gammas between the asymmetric gamma and the symmetric gamma is applied is displayed during set frame periods. Thus, the flicker phenomenon caused by a sudden gamma change may be substantially reduced or effectively prevented.

Figure 8:
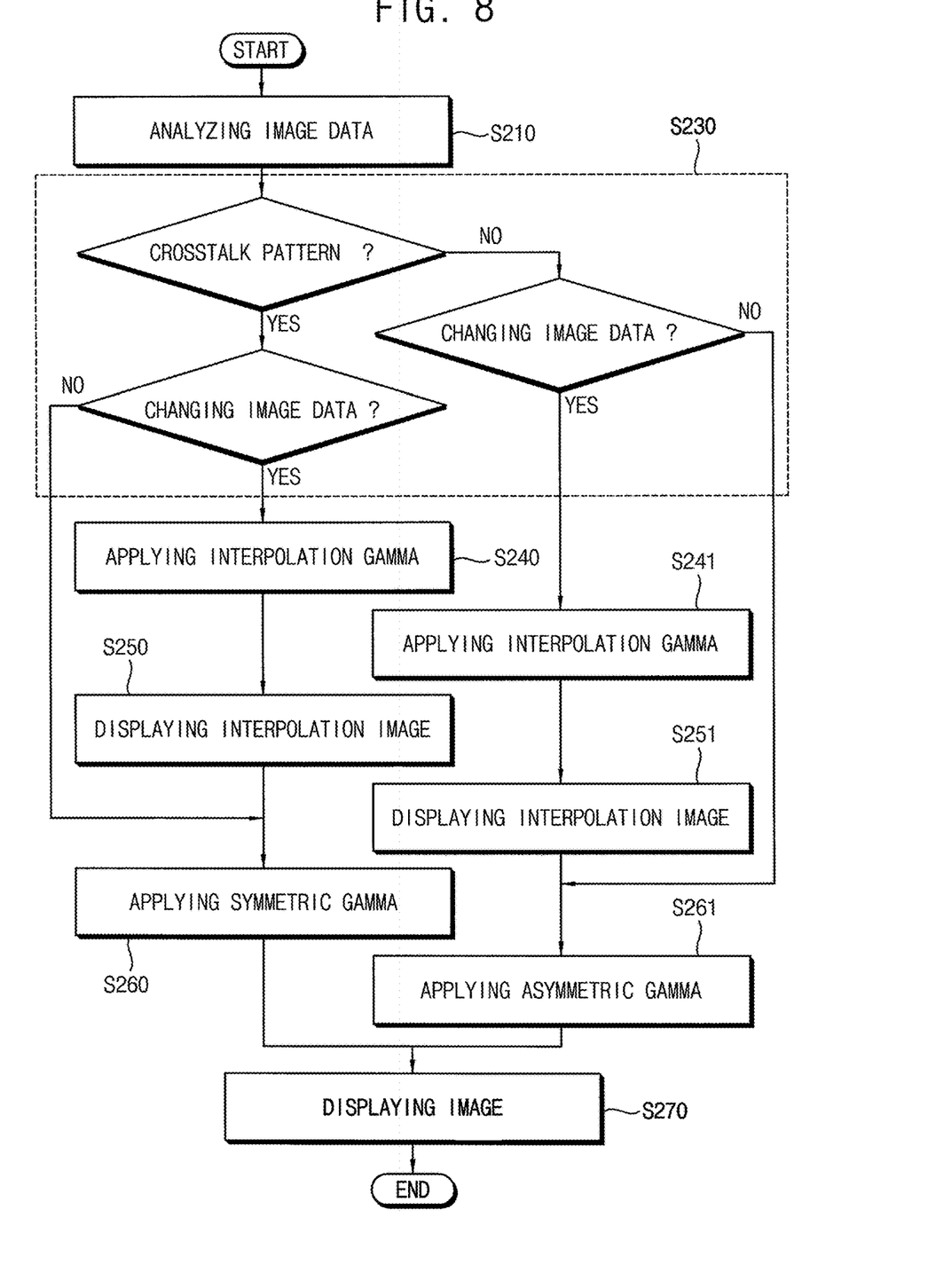
FIG. 8 is a flowchart illustrating a method of driving a display device according to an exemplary embodiment.

FIG. 8 is a flowchart illustrating a method of driving a display device according to an exemplary embodiment.

Referring to FIGS. 1, 3, 7 and 8, the image analyzing part 230 compares and analyzes the current frame image data DATA(n) with the previous frame image data stored in the storage part 210 (S210).

In an exemplary embodiment, the image analyzing part 230 determines whether the current frame image data DATA (n) are the crosstalk image data including the crosstalk pattern CROSSTALK_PATTERN or the normal image data not including the crosstalk pattern CROSSTALK_PATTERN. In such an embodiment, the image analyzing part 230 determines whether the previous frame image data are the crosstalk image data or the normal image data (S230).

When it is determined that the current frame image data DATA(n) are the crosstalk image and changed from the previous frame image data being the normal image data (S230), the image analyzing part 230 generates the first gamma control signal GCS1.

The gamma data controller 310 controls the interpolation gamma generator 370 to generate an interpolation frame gamma data INT_DATA(n) for the current frame image data DATA(n) during the set frame periods based on the first gamma control signal GCS1 and outputs the interpolation frame gamma data INT_DATA(n) (S240).

The data driver 400 and the gate driver 500 display the interpolation image corresponding to the interpolation frame gamma data INT_DATA(n) on the display panel 100 for the set frame periods (S250).

Then, when the set frame periods end, the gamma data controller 310 uses the symmetric gamma generator 330 to generate current frame gamma data G_DATA(n) for the current frame image data DATA(n) and outputs the current frame gamma data G_DATA(n) (S260).

The data driver 400 and the gate driver 500 display the crosstalk pattern image corresponding to the current frame gamma data G_DATA(n) on the display panel 100 (S270).

Therefore, in such an embodiment, by applying symmetric gamma to a box image of a middle grayscale displayed in a mono color at the center of the crosstalk pattern, the common voltage ripple may be reduced. The horizontal crosstalk caused by the common voltage ripple may be improved when the crosstalk pattern is displayed. In such an embodiment, when the normal image changes to the crosstalk pattern image, the interpolation gamma between the asymmetric gamma and the symmetric gamma is applied and displayed for set frame periods, thereby improving flicker due to a sudden gamma change.

In such an embodiment, the image analyzing part 230 outputs the second gamma control signal GCS2 when the current frame image data DATA(n) are the crosstalk image data being the same as the previous frame image data (S230).

The gamma data controller 310 generates the current frame gamma data G_DATA(n) for the current frame image data DATA(n) by using the symmetric gamma generator 330 based on the second gamma control signal GCS2 and outputs the current frame gamma data G_DATA(n) (S260).

The data driver 400 and the gate driver 500 display the crosstalk pattern image corresponding to the current frame gamma data G_DATA (n) on the display panel 100 (S270).

Therefore, by applying symmetric gamma to a box image of a middle grayscale displayed in a mono color at the center of the crosstalk pattern, the common voltage ripple may be reduced. The horizontal crosstalk caused by the common voltage ripple may be improved when the crosstalk pattern is displayed.

In such an embodiment, when the current frame image data DATA(n) are the normal image data and are changed from the previous frame image data being the crosstalk image data (S230), the image analyzing part 230 generates the third gamma control signal GCS3.

The gamma data controller 310 controls the interpolation gamma generator 370 to generate an interpolation frame gamma data INT_DATA(n) for the current frame image data DATA(n) during the set frame periods based on the third gamma control signal GCS3 and outputs the interpolation frame gamma data INT_DATA(n) (S241).

The data driver 400 and the gate driver 500 display the interpolation image corresponding to the interpolation frame gamma data INT_DATA(n) on the display panel 100 for the set frame periods (S251).

Then, when the set frame periods end, the gamma data controller 310 uses the asymmetric gamma generator 350 to generate current frame gamma data G_DATA(n) for the current frame image data DATA(n) and outputs the current frame gamma data G_DATA(n) (S261).

The data driver 400 and the gate driver 500 display the crosstalk pattern image corresponding to the current frame gamma data G_DATA(n) on the display panel 100 (S270).

Therefore, in an exemplary embodiment, the normal image may be displayed with improved quality by applying the asymmetric gamma in the middle grayscale area, and the horizontal crosstalk may be reduced by applying the symmetric gamma in the low grayscale area and the high grayscale area. In such an embodiment, when the crosstalk pattern image changes to the normal image, the interpolation gamma between the asymmetric gamma and the symmetric gamma is applied and displayed for set frame periods, thereby improving flicker due to a sudden gamma change.

In such an embodiment, when the current frame image data DATA(n) are the normal image data being the same as the previous frame image data (S230), the image analyzing part 230 outputs the fourth gamma control signal GCS4.

The gamma data controller 310 generates the current frame gamma data G_DATA(n) for the current frame image data DATA(n) using the asymmetric gamma generator 350 based on the fourth gamma control signal GCS4 and outputs the current frame gamma data G_DATA(n) (S261).

The data driver 400 and the gate driver 500 displays the normal image corresponding to the current frame gamma data G_DATA(n) on the display panel 100 (S270).

Therefore, the normal image may be displayed with improved quality by applying the asymmetric gamma in the middle grayscale area, and the horizontal crosstalk may be improved by applying the symmetric gamma in the low grayscale area and the high grayscale area.

According to exemplary embodiments, the display quality may be improved by applying symmetric gamma to image data including a crosstalk pattern, in which crosstalk may be observed, and applying asymmetric gamma to the normal image data.

Exemplary embodiments of the invention may be applied to a display device and an electronic device having the display device. Exemplary embodiments of the invention may be applied to a computer monitor, a laptop, a digital camera, a cellular phone, a smart phone, a smart pad, a television, a personal digital assistant ("PDA"), a portable multimedia player ("PMP"), a MP3 player, a navigation system, a game console or a video phone, for example.

The invention should not be construed as being limited to the exemplary embodiments set forth herein. Rather, these exemplary embodiments are provided so that this disclosure will be thorough and complete and will fully convey the concept of the invention to those skilled in the art.

While the invention has been particularly shown and described with reference to exemplary embodiments thereof, it will be understood by those of ordinary skill in the art that various changes in form and details may be made therein without departing from the spirit or scope of the invention as defined by the following claims.

What is claimed is:

1. A display device comprising:
   a display panel comprising a data line and sub-pixels of different colors, wherein the sub-pixels of different colors are connected to a same data line;
   a data driver which outputs a positive polarity data voltage and a negative polarity data voltage with respect to a reference voltage to the data line;
   an image analyzing part which determines whether current frame image data includes a crosstalk pattern; and
   a gamma voltage generator which generates current frame gamma data by applying an asymmetric gamma when the current frame image data do not include the crosstalk pattern, and generates the current frame gamma data by applying a symmetric gamma when the current frame image data includes the crosstalk pattern,
   wherein the positive polarity and negative polarity data voltages of the asymmetric gamma are asymmetric with each other for each grayscale of a plurality of grayscales, and
   the positive polarity and negative polarity data voltages of the symmetric gamma are symmetric with each other for each of the grayscales,
   wherein
   a grayscale area comprises a low grayscale area including a grayscale lower than a reference low grayscale, a high grayscale area including a grayscale higher than a reference high grayscale and an intermediate grayscale area including an intermediate grayscale between the reference low grayscale and the reference high grayscale,
   the positive polarity and negative polarity data voltages of the asymmetric gamma are symmetric with each other for each of the grayscales in the low grayscale area and the high grayscale area, and
   the positive polarity and negative polarity data voltages of the asymmetric gamma are asymmetric with each other for each of the grayscales in the middle grayscale area.

2. The display device of claim 1, wherein the gamma voltage generator comprises:
   a symmetric gamma generator which generates the current gamma data for each of the grayscales by applying the symmetric gamma; and
   an asymmetric gamma generator which generates the current gamma data for each of the grayscales by applying the asymmetric gamma.

3. The display device of claim 2, further comprising:
   an interpolation gamma generator which generates the current frame gamma data for each of the grayscales by applying an interpolation gamma having a value between the symmetric gamma and the asymmetric gamma.

4. The display device of claim 3, wherein
   the interpolation gamma generator generates the current frame gamma data by applying the interpolation gamma during set frame periods when the current frame image data include the crosstalk pattern and previous frame image data do not include the crosstalk pattern.

5. The display device of claim 3, wherein
   the interpolation gamma generator generates the current frame gamma data by applying the interpolation gamma during set frame periods when the current frame image data do not include the crosstalk pattern and previous frame image data include the crosstalk pattern.

6. The display device of claim 3, wherein the interpolation gamma generator comprises a plurality of interpolation gammas which change gradually.

7. The display device of claim 3, wherein the gamma generator comprise a look-up table or a calculation circuit.

8. The display device of claim 1, wherein
   the positive polarity and negative polarity data voltages of the symmetric gamma are symmetric with each other for each of the grayscales in the low grayscale area, the middle grayscale area and the high grayscale area.

9. The display device of claim 1, wherein the crosstalk pattern comprises a background image of a low grayscale and a box image comprising a middle grayscale of a mono color and located in a center of the background image.

10. A method of driving a display device which comprises a data line and sub-pixels of different colors, wherein the sub-pixels are connected to a same data line, the method comprising:
    determining whether current frame image data includes a crosstalk pattern; and
    generating current frame gamma data based on a result of the determining whether the current frame image data includes the crosstalk pattern,
    wherein the generating the current frame gamma data comprises:
      generating the current frame gamma data by applying an asymmetric gamma when the current frame image data do not include the crosstalk pattern, wherein the positive polarity and negative polarity data voltages of the asymmetric gamma are asymmetric with each other for each grayscale of a plurality of grayscales; and
      generating the current frame gamma data by applying a symmetric gamma when the current frame image data includes the crosstalk pattern, wherein the positive polarity and negative polarity data voltages of the symmetric gamma are symmetric with each other for each of the grayscales,
    wherein
    a grayscale area comprises a low grayscale area including a grayscale lower than a reference low grayscale, a high grayscale area including a grayscale higher than a reference high grayscale and an intermediate grayscale area including an intermediate grayscale between the reference grayscale and the reference high grayscale,
    the positive polarity and negative polarity data voltages of the asymmetric gamma are symmetric with each other for each of the grayscales in the low grayscale area and the high grayscale area, and
    the positive polarity and negative polarity data voltages of the asymmetric gamma are asymmetric with each other for each of the grayscales in the middle grayscale area.

11. The method of claim 10, wherein the generating the current frame gamma data further comprises:

generating the current frame gamma data for each of the grayscales by applying an interpolation gamma having a value between the symmetric gamma and the asymmetric gamma.

12. The method of claim 11, wherein the generating the current frame gamma data further comprises:
generating the current frame gamma data by applying the interpolation gamma during set frame periods when the current frame image data include the crosstalk pattern and previous frame image data do not include the crosstalk pattern.

13. The method of claim 11, wherein the generating the current frame gamma data further comprises:
generating the current frame gamma data by applying the interpolation gamma during set frame periods when the current frame image data do not include the crosstalk pattern and previous frame image data include the crosstalk pattern.

14. The method of claim 11, wherein the generating the current frame gamma data further comprises:
using a look-up table or a calculation circuit.

15. The method of claim 10, wherein
the positive polarity and negative polarity data voltages of the symmetric gamma are symmetric with each other for each of the grayscales in the low grayscale area, the middle grayscale area and the high grayscale area.

16. A display device comprising:
a display panel comprising a data line and sub-pixels of different colors, wherein the sub-pixels of different colors are connected to a same data line;
a data driver which outputs a positive polarity data voltage and a negative polarity data voltage with respect to a reference voltage to the data line;
an image analyzing part which determines whether current frame image data includes a crosstalk pattern; and
a gamma voltage generator which generates current frame gamma data by applying an asymmetric gamma when the current frame image data do not include the crosstalk pattern, and generates the current frame gamma data by applying a symmetric gamma when the current frame image data includes the crosstalk pattern,
wherein the positive polarity and negative polarity data voltages of the asymmetric gamma are asymmetric with each other for each grayscale of a plurality of grayscales, and
the positive polarity and negative polarity data voltages of the symmetric gamma are symmetric with each other for each of the grayscales,
wherein the gamma voltage generator comprises:
a symmetric gamma generator which generates the current gamma data for each of the grayscales by applying the symmetric gamma;
an asymmetric gamma generator which generates the current gamma data for each of the grayscales by applying the asymmetric gamma; and
an interpolation gamma generator which generates the current frame gamma data for each of the grayscales by applying an interpolation gamma having a value between the symmetric gamma and the asymmetric gamma, and
wherein the interpolation gamma generator generates the current frame gamma data by applying the interpolation gamma during set frame periods when the current frame image data include the crosstalk pattern and previous frame image data do not include the crosstalk pattern or when the current frame image data do not include the crosstalk pattern and the previous frame image data include the crosstalk pattern.

17. A method of driving a display device which comprises a data line and sub-pixels of different colors, wherein the sub-pixels are connected to a same data line, the method comprising:
determining whether current frame image data includes a crosstalk pattern; and
generating current frame gamma data based on a result of the determining whether the current frame image data includes the crosstalk pattern,
wherein the generating the current frame gamma data comprises:
generating the current frame gamma data by applying an asymmetric gamma when the current frame image data do not include the crosstalk pattern, wherein the positive polarity and negative polarity data voltages of the asymmetric gamma are asymmetric with each other for each grayscale of a plurality of grayscales; and
generating the current frame gamma data by applying a symmetric gamma when the current frame image data includes the crosstalk pattern, wherein the positive polarity and negative polarity data voltages of the symmetric gamma are symmetric with each other for each of the grayscales,
wherein the generating the current frame gamma data further comprises:
generating the current frame gamma data for each of the grayscales by applying an interpolation gamma having a value between the symmetric gamma and the asymmetric gamma, and
wherein the generating the current frame gamma data further comprises:
generating the current frame gamma data by applying the interpolation gamma during set frame periods when the current frame image data include the crosstalk pattern and previous frame image data do not include the crosstalk pattern or when the current frame image data do not include the crosstalk pattern and the previous frame image data include the crosstalk pattern.

* * * * *